May 7, 1940. A. C. PETERSON 2,199,672
APPARATUS FOR DETERMINING ACCELERATION OF A MACHINE OR THE LIKE
Filed July 6, 1936 8 Sheets-Sheet 1
FIG-I-
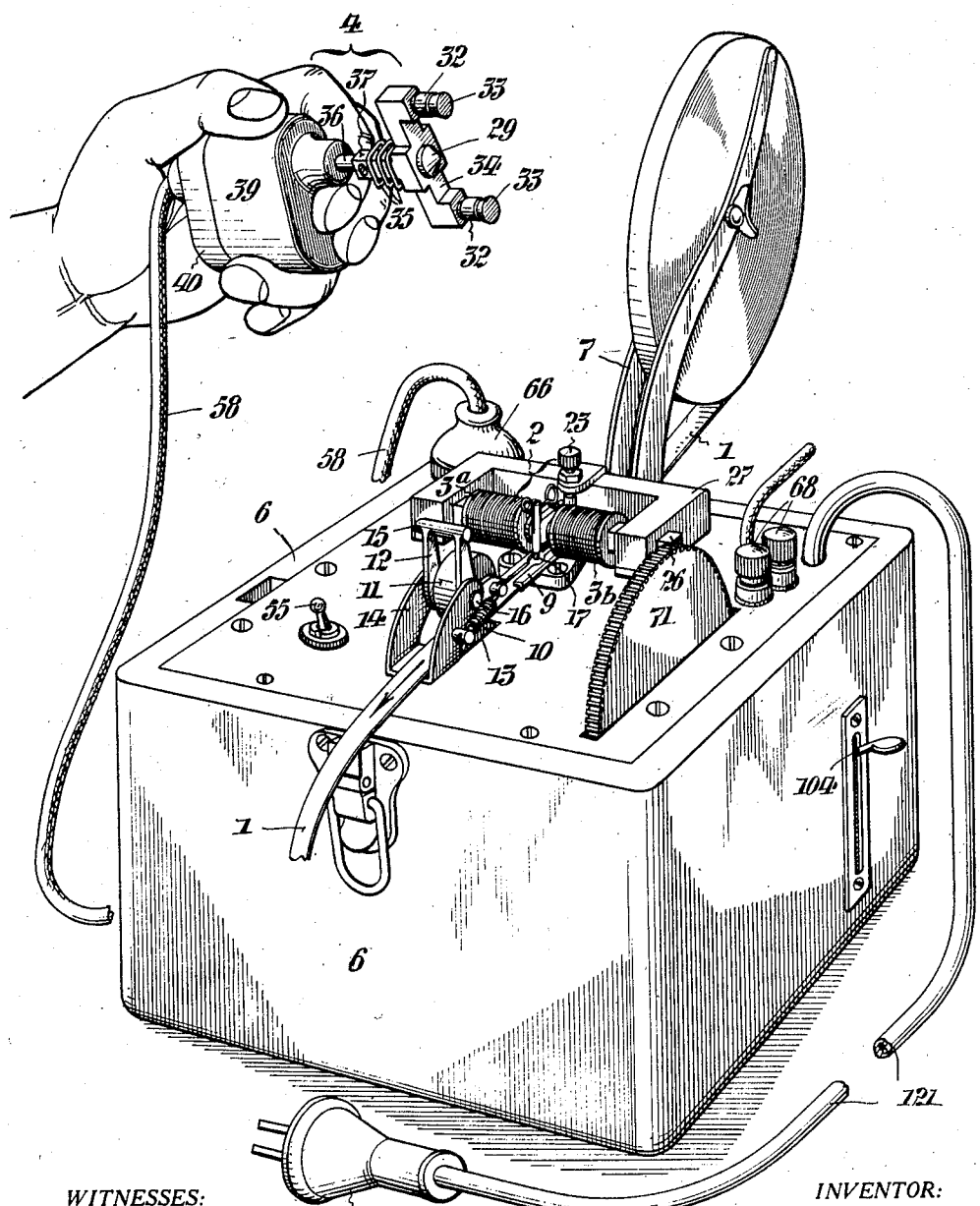
WITNESSES:
Hubert Fuchs
William Bell, Jr.
INVENTOR:
Albert C. Peterson,
BY Fraley Paul
ATTORNEYS.

May 7, 1940. A. C. PETERSON 2,199,672
APPARATUS FOR DETERMINING ACCELERATION OF A MACHINE OR THE LIKE
Filed July 6, 1936 8 Sheets-Sheet 2
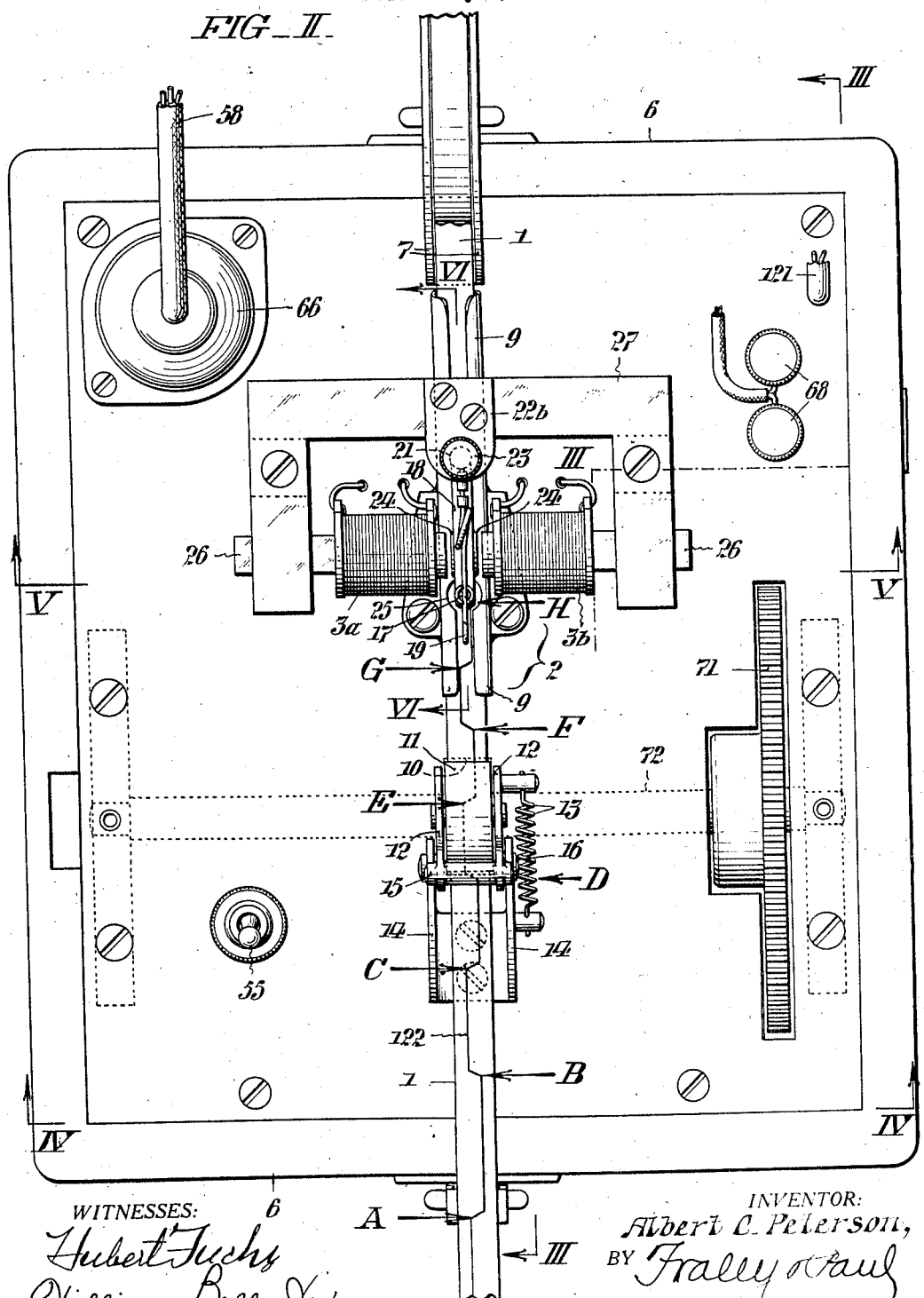
FIG. II
WITNESSES:
Hubert Fuchs
William Bell, Jr.
INVENTOR:
Albert C. Peterson,
BY Fralley & Paul
ATTORNEYS.

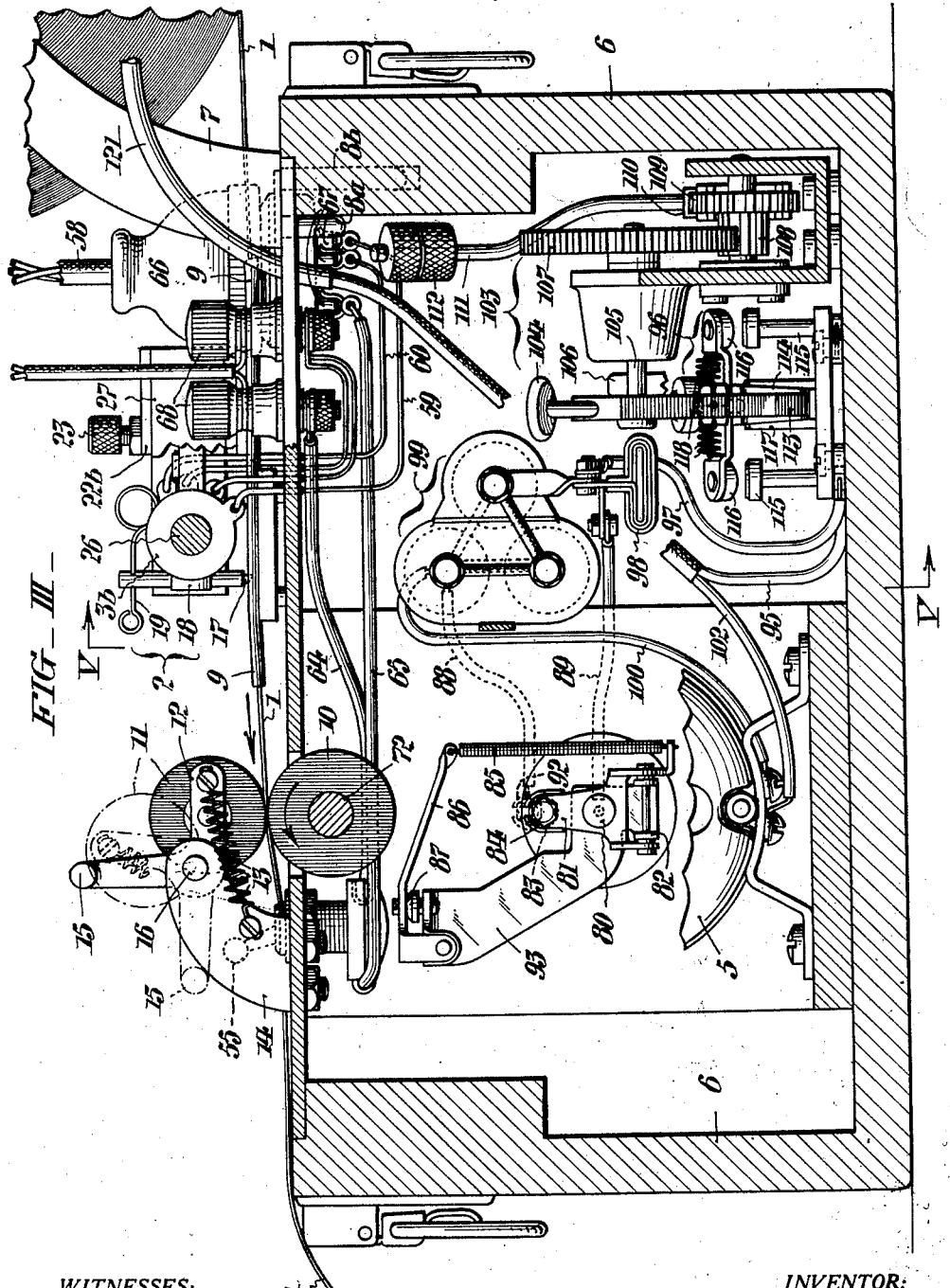

May 7, 1940.  A. C. PETERSON  2,199,672
APPARATUS FOR DETERMINING ACCELERATION OF A MACHINE OR THE LIKE
Filed July 6, 1936  8 Sheets-Sheet 4
FIG. IV
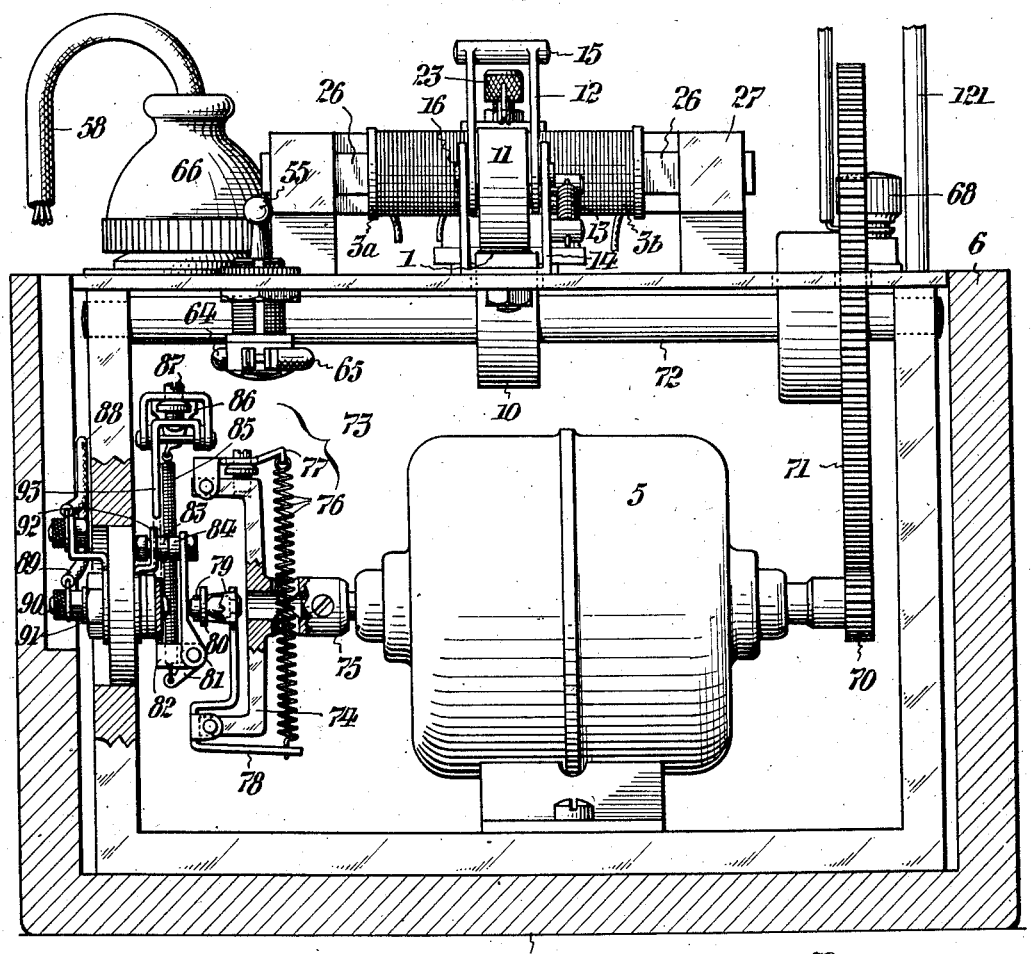
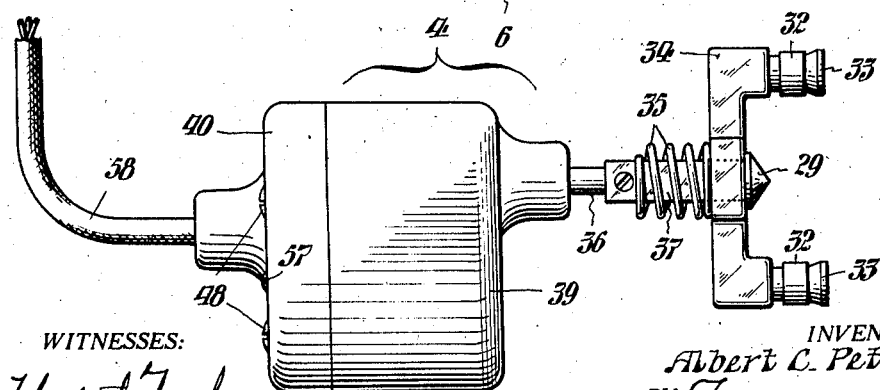
WITNESSES:
INVENTOR:
Albert C. Peterson,
BY
ATTORNEYS.

May 7, 1940.  A. C. PETERSON  2,199,672
APPARATUS FOR DETERMINING ACCELERATION OF A MACHINE OR THE LIKE
Filed July 6, 1936  8 Sheets-Sheet 5
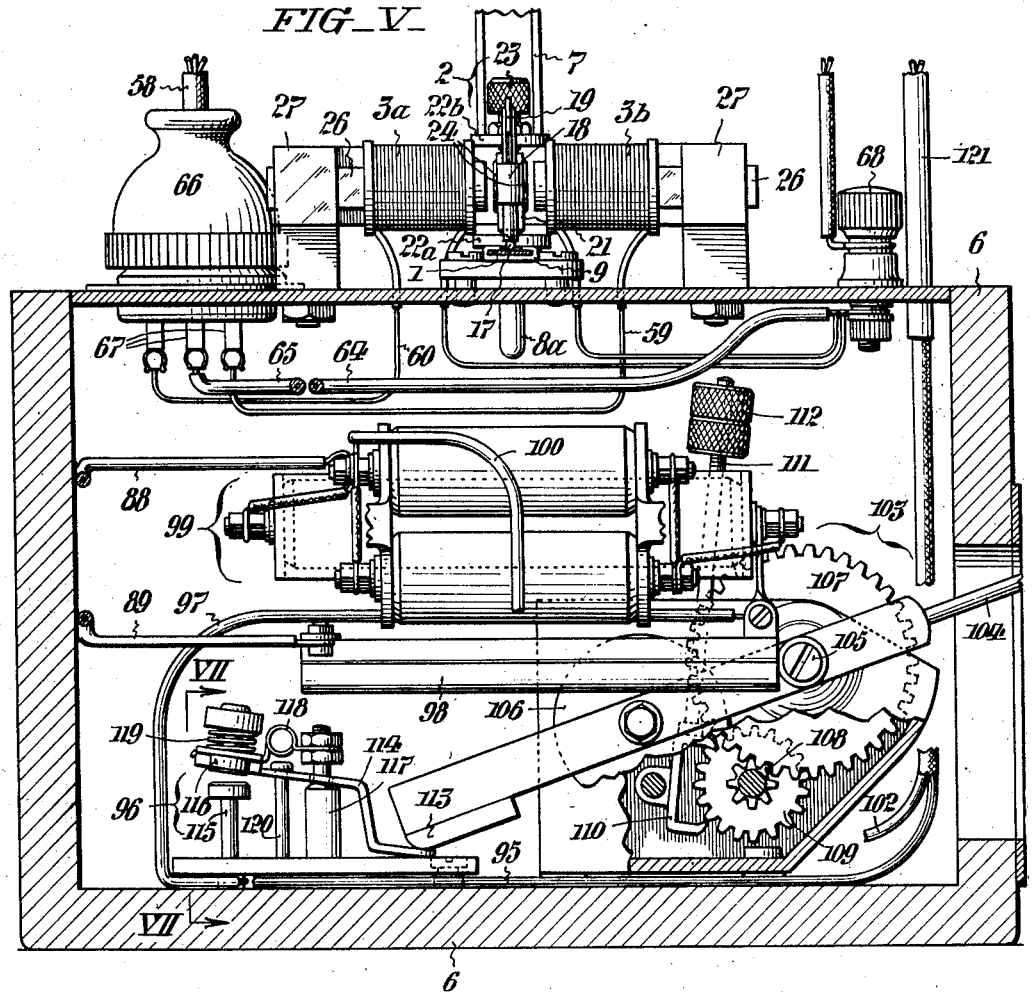
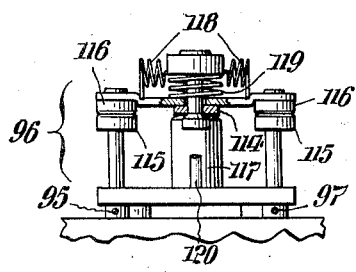
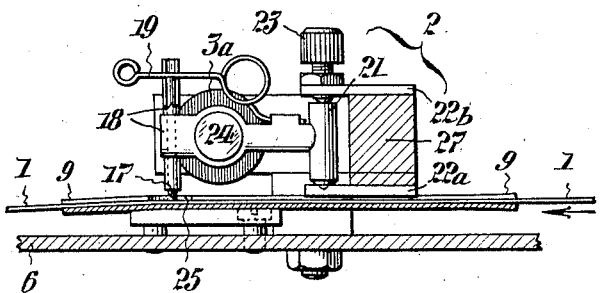
WITNESSES:
INVENTOR:
Albert C. Peterson,
BY
ATTORNEYS.

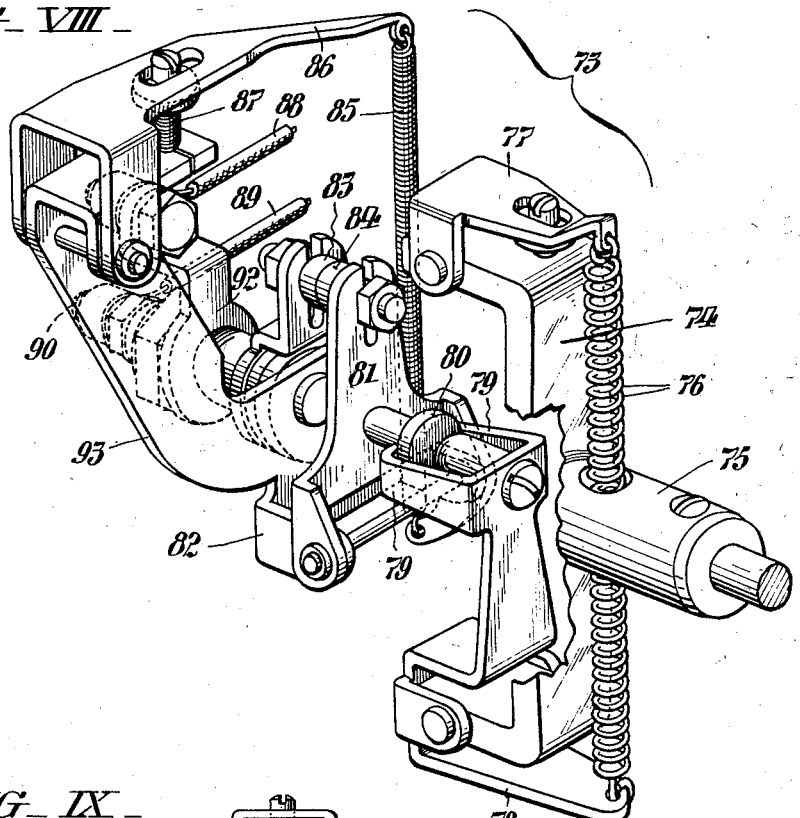
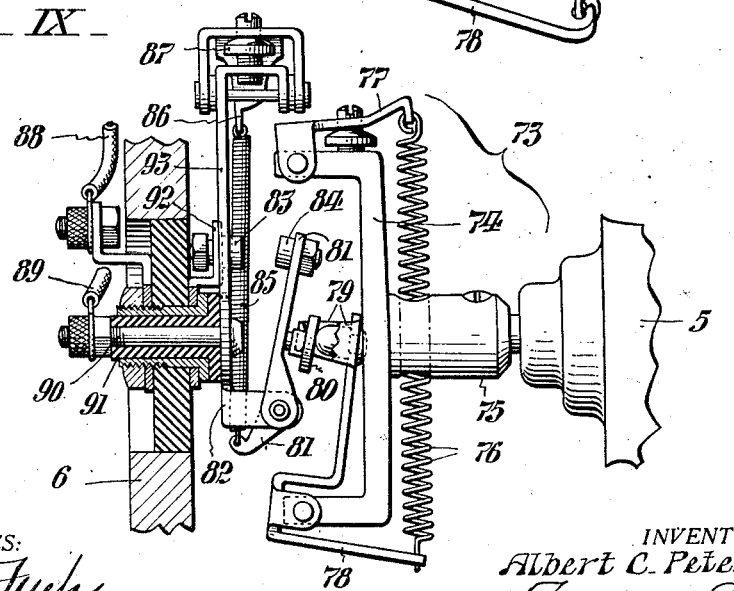

May 7, 1940.  A. C. PETERSON  2,199,672
APPARATUS FOR DETERMINING ACCELERATION OF A MACHINE OR THE LIKE
Filed July 6, 1936  8 Sheets-Sheet 7
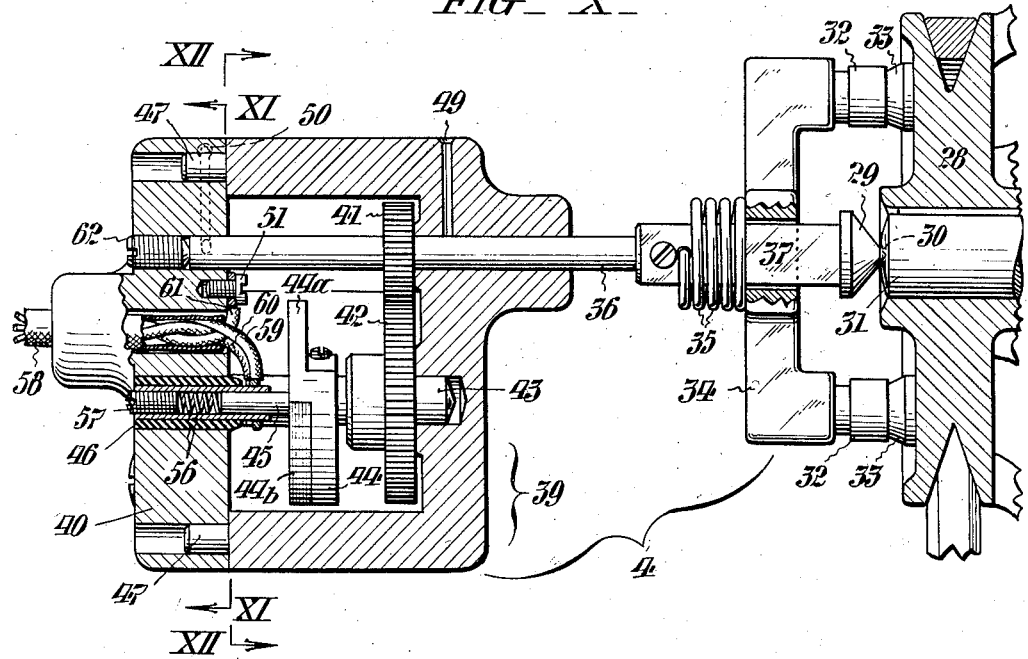
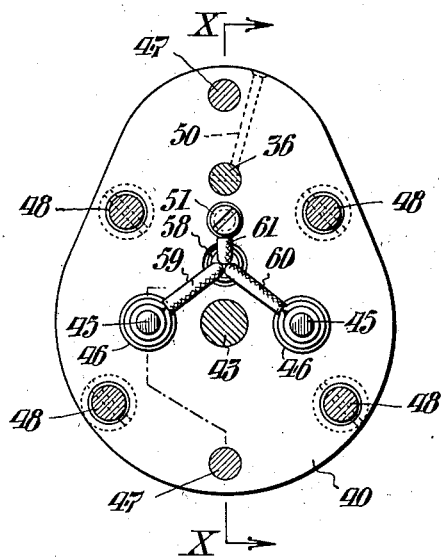
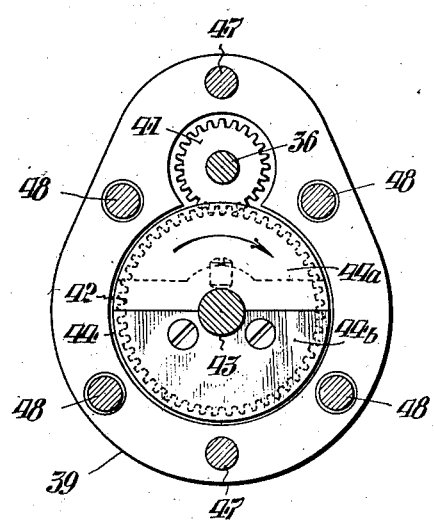
WITNESSES:
Hubert Fuchs
William Bell, Jr.
INVENTOR:
Albert C. Peterson,
BY
ATTORNEYS.

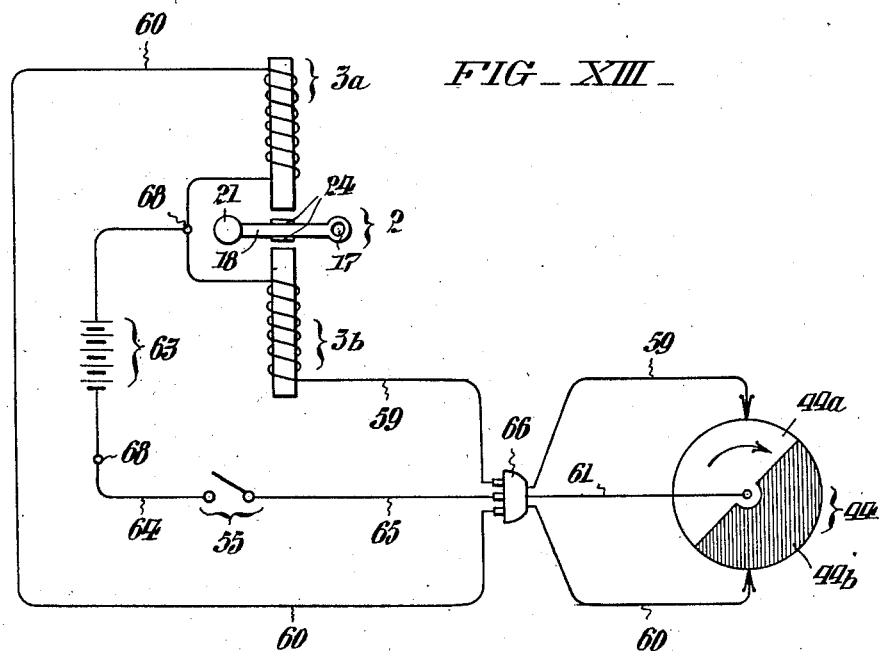
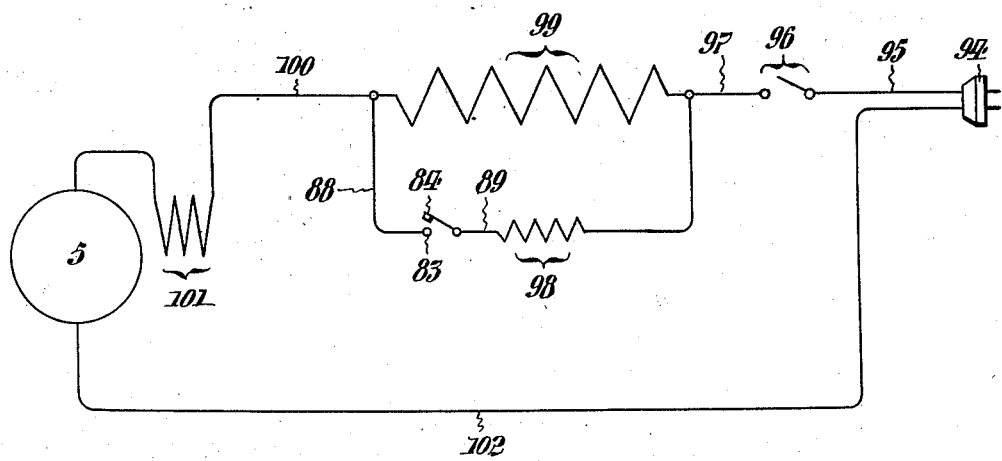

Patented May 7, 1940

2,199,672

UNITED STATES PATENT OFFICE 2,199,672

APPARATUS FOR DETERMINING ACCELERATION OF A MACHINE OR THE LIKE

Albert C. Peterson, Chicago, Ill., assignor to Union Special Machine Company, Chicago, Ill., a corporation of Illinois Application July 6, 1936, Serial No. 88,984

3 Claims. (Cl. 234—5.8)

This invention relates to apparatus for determining acceleration of a machine, or the like, and is particularly useful for determining the rate of acceleration of high speed machines, and for measuring the length of time required for such a machine to reach full speed from a standing start.

While the apparatus of this invention may be applied to many different types of machines, it has special advantage when used in connection with machines which depend for efficiency upon their ability to start and reach maximum speed in the shortest possible time. For example, in the sewing machine art, many sewing operations are of relatively short length and require only a few seconds, at most, to finish. If the motor, or other means for driving a sewing machine, is not capable of bringing the machine to its maximum speed in a short space of time, there is an obvious loss of efficiency, and hence a limitation upon the production obtainable from the machine.

Accordingly, the primary object of this invention is to provide a device for determining the rate of acceleration and the starting interval of a high speed machine, and an equally important object is to provide measuring apparatus of this character which is extremely sensitive and extremely accurate. The importance of sensitivity and accuracy will be appreciated when it is considered that modern high speed sewing machines are capable of accelerating from a standing start to a full speed of, say, 3700 revolutions per minute in one-tenth of a second. The device of this invention makes it possible with such a sewing machine, or with machines of even greater acceleration, to count the number of stitches formed from the moment of standing start to the moment when the machine reaches its full speed, and additionally to measure the total elapsed time for such acceleration.

Other objects and advantages of this invention, including those derived from the use of a simple, compact, and portable measuring device, will be apparent from the description of one example or embodiment of the invention, hereinafter set forth, having reference to the accompanying drawings, whereof:

Fig. I represents a perspective view of the apparatus of this invention.

Fig. II represents a top plan view of the case in which certain of the parts are carried.

Fig. III represents a cross section of the case, taken as indicated by the lines III—III of Fig. II.

Fig. IV represents an additional cross section of the case, taken along the lines indicated IV—IV of Fig. II.

Fig. V represents an additional cross section, taken centrally of the case, along the lines indicated at V—V of Figs. II and III.

Fig. VI represents a cross section, taken as indicated by the lines VI—VI of Fig. II, showing details of the recording stylus, and the manner in which it is mounted on the case.

Fig. VII represents a cross section, taken as indicated by the lines VII—VII of Fig. V, showing details of the movable contacts of a time switch.

Fig. VIII represents a perspective view of a governor for controlling an electric motor so that it runs at a constant speed.

Fig. IX represents a side elevation of said speed governor.

Fig. X represents an enlarged detailed view, partly in section taken as indicated by the lines X—X of Fig. XI, illustrating a hand piece which is applied to and driven by the machine under test.

Fig. XI represents a cross section of the hand piece, taken as indicated by the lines XI—XI of Fig. X.

Fig. XII represents an additional cross section of the hand piece, taken as indicated by the lines XII—XII of Fig. X.

Fig. XIII represents a wiring diagram showing the circuits for operating the recording device; and, Fig. XIV represents a wiring diagram showing the circuits for controlling the operation of the driving motor.

With reference to the drawings, the apparatus shown comprises generally a traveling chart in the form of a tape 1, a recording device comprehensively designated at 2, a pair of electromagnets 3a, 3b for operating the recording device, and means for energizing and de-energizing the electro-magnets 3a, 3b including a hand piece designated at 4 which is adapted to be applied to and driven by the machine under test and which includes a switching device or commutator. The tape 1 is caused to travel at a constant lineal velocity by apparatus including an electric motor 5, such apparatus being housed within a case 6, and the recording device 2 is moved in different (opposite) directions at successive cycles of the machine, as described hereinafter. The parts in and on the case 6 may be collectively distinguished as the recording unit; and the mobile hand piece 4 may be flexibly connected thereto, as hereinafter described, so that it can be moved around freely for actuation by the machine.

With reference to Fig. I, it will be observed that the roll of tape 1 is carried by a reel 7 supported at the top of the case 6. The reel 7 may take any convenient form, but desirably comprises a pair of spaced elements which serve to hold the tape in roll form and to guide the free end as it is unreeled across the top of the case. The reel 7 is affixed to the case 6 by means of a pair of lugs 8a, 8b (most clearly shown in Fig.

III) which fit within sockets formed at the top of the case in such manner that the reel may be readily removed when not in use.

The tape 1 passes from the reel 7 to an elongated tape guide 9 extending beneath the recording device 2, and from thence the tape passes through a pair of rollers 10, 11 made of rubber or like material, one such roller, 10, being driven at a constant speed by the electric motor 5, and the other roller, 11, pressing against the top of the tape 1. Thus the tape 1 is unreeled and drawn past the recording stylus 17 at high but uniform velocity of travel. The tape guide 9 is shown as a channeled guideway that engages and overlaps the edges of the tape so as to control its path of travel transversely, as well as perpendicular to its surface. The top roller 11 is supported within a bracket 12 and normally urged by means of a spring 13 towards the bottom roller 10. The roller bracket 12 is in turn pivotally mounted within an additional bracket 14 affixed to the top of the case 6. By means of a handle 15 on the bracket 12, the top roller 11 may be swung upwardly and rearwardly to the position shown in dot-and-dash lines in Fig. III, wherein it is out of engagement with the bottom roller 10, thus permitting ready insertion of the tape. In an obvious manner, the spring 13, when it passes the center of the pivot pin 16 by which the bracket 12 is supported within the bracket 14, will exert its force in a direction to separate the two rollers 10, 11. After passing through the rollers 10, 11, and through the bracket 14, the tape 1 continues in its movement beyond the edge of the case 6.

The recording device 2, as shown most clearly in Fig. VI, comprises a stylus 17 fitting in a holder 18 and urged against the tape 1 by means of a spring 19. The holder 18 has a vertical post 21 pivoted at its base on a plate 22a, and pivoted at its upper end by means of an adjusting screw 23, inserted through a plate 22b and serving to regulate the freedom of movement of the post 21. The holder 18 includes an armature 24 of magnetic material which is disposed in line with the axes of the electro-magnets 3a, 3b placed at either side thereof. Desirably the tape guide 9 has a circular cut-out 25 accommodating the end of the stylus 17 and allowing for its lateral movement. In an obvious manner, when the electro-magnet 3a is energized, the stylus 17 is drawn to one side of the tape 1, and when the electro-magnet 3b is energized, the stylus 17 is drawn to the opposite side of the tape. Thus the recording device 2 serves to draw a continuous line on the tape 1 shifting from side to side in accordance with the frequency of operation of the electro-magnets 3a, 3b.

The electro-magnets 3a, 3b are mounted at each side of the tape 1 on cores 26 of magnetic material, and the cores 26 are supported by a U-shaped magnet 27 attached to the top of the case 6. The electro-magnets 3a, 3b are alternately energized at a frequency corresponding to successive revolutions of the machine under test in the following manner. The hand piece 4, shown most clearly in Figs. I, X, XI and XII, is applied to a rotating part 28 of the machine, the acceleration of which is to be measured. In the present example, it may be assumed that the part 28 comprises the driven wheel of a sewing machine. A center point 29 engages a pin hole 30 in the end of the shaft 31 of the sewing machine. To prevent slippage, fingers 32, preferably provided with tips 33 of cork or other non-slipping material, engage the wheel 28 at opposite points spaced from the axis of the shaft 31. The fingers 32 are carried by an arm 34 urged by a spring 35 toward the wheel 28. The shaft 36 which carries the center point 29 is square in cross section at the region indicated at 37, and it slides freely within a similarly shaped socket in the arm 34. Thus the shaft 36 is caused to revolve at a speed corresponding exactly to that of the wheel 28.

The hand piece 4 includes a casing 39 of conducting material having a removable cover 40. Within the casing 39 there is a pinion 41 on the shaft 36 which engages a gear 42 on a stub shaft 43, the gear 42 having twice as many teeth as the pinion 41, whereby it is driven at half the speed of the machine under test. On the stub shaft 43 there is mounted a disc 44, one-half the face of which, as designated at 44a, is of good conducting material such as brass, and the other half of which, as designated at 44b, is of non-conducting material, such as fiber. A pair of brushes 45, spaced 180° apart, are urged towards the face of the disc 44 by springs 56, the force of these springs being rendered adjustable by set screws 57.

Within a flexible connection 58 between the hand piece 4 and the case 6, three wires 59, 60, 61 are inserted, the wires 59, 60, leading to the two brushes 45 which engage the face of the disc 44, and the third wire 61 being grounded at 51 to the cover 40 and thence in electrical contact with the conducting portion 44a of the disc 44. Suitable insulation 46 is provided within the cover 40 to prevent short circuiting between the wires 59, 60, 61. An adjusting screw 62 is also provided in the cover 40 to insure that when the parts are assembled the pinion 41 will mesh properly with the gear 42. The cover 40 is affixed to the casing 39 by means of centering pins 47 and screws 48. Oiling holes 49, 50 permit lubrication of the moving parts within the casing 39.

In Fig. XIII there is shown a wiring diagram illustrating the connections between the electro-magnets 3a, 3b and the revolving disc 44 of the hand piece 4. Electric current is supplied by a battery 63, or some other suitable source. From the positive side of the battery 63 current leads through a conductor 64 to a hand switch 55 (preferably placed at the top of the case 6 as shown in Fig. I) and thence to a conductor 65 to plug 66. From the negative side of battery 63, one branch leads through electro-magnet 3a to the wire 60, and the other branch leads through the electro-magnet 3b to the wire 59. In an obvious manner, when the wire 59 is in contact with the conducting portion 44a of the disc 44, electro-magnet 3b will be energized and electro-magnet 3a will be de-energized. In a like manner, when the wire 60 is in contact with the conducting portion 44a of the disc 44, the electro-magnet 3a will be energized, and the electro-magnet 3b de-energized. Thus the disc 44 acts as a commutator, and causes the electro-magnets 3a, 3b to be alternately energized at a frequency corresponding to the revolutions of the machine under test. During one revolution of the machine, which corresponds to a half revolution of the disc 44, instantaneously one electro-magnet will be energized, drawing the armature 24 of the recording device to one side of the tape, and during the next revolution, the armature will be instantaneously drawn by the other electro-magnet to the other side of the tape. In other words, the electro-magnets 3a, 3b are energized in alternation, to operate the stylus 17 positively both ways, during each revolution or cycle of operation of the commutator or switching means 44, which corresponds to two revolutions or cycles of the machine under test. Hence the stylus 17 is moved to and fro transversely with respect to the line or path of travel of the tape 1 as determined by the guideway 9, in opposite directions at successive revolutions or complete cycles of operation of the machine under test, making corresponding single transverse marks on the tape, in opposite directions at successive revolutions. Thus the stylus 17 is caused to draw a zigzag line on the tape 1, with the distance between successive transverse marks representing the time consumed for each successive revolution of the machine. Owing to the transverse control of the tape 1 by the guideway 9, the longitudinal marks connecting said transverse ones are substantially straight and regular.

The flexible connection 58 to the hand piece 4 desirably enters the case 6 through a plug 66 which has pins 67 engaging within sockets in the case 6 and making electrical contact with wires within the case. At the top of the case 6 two terminals 68 are provided which establish connections to the battery 63.

The mechanism for driving the tape roller 10 is most clearly shown in Fig. IV. One end of the driving shaft of the motor 5 has thereon a pinion 70 which engages a gear 71 on a shaft 72 extending horizontally beneath the top of the case 6 and having its ends supported in suitable bearings. The tape driving roller 10 is mounted on the shaft 72.

The other end of the shaft of the motor 5 carries a speed governing device comprehensively designated at 73. This device is shown in detail in Figs. VIII and IX. It comprises a rotary member 74 having a perforated hub 75 through which a tension spring 76 is inserted. The spring 76 connects together two pivoted arms 77, 78. The pivoted arms 77, 78 act in the manner of fly weights. As the speed of the motor 5 increases, the resistance of the spring 76 is gradually overcome and the arms 77, 78 tend to spread apart. The arm 78 has fingers 79 which loosely engage a disc 80 on the rear side of a movable contact member 81. The movable contact member 81 is pivoted to a fixed contact member 82. Normally the parts occupy the position shown in Figs. IV and VIII, with the electrical contacts 83, 84 engaging each other. If the motor speed increases beyond a predetermined normal speed, the pivoted arms 77, 78 separate in the manner shown in Fig. IX, causing disengagement of the electrical contacts 83, 84. The contact member 81 is under the influence of a spring 85 connected at the end of a pivoted bracket 86, the force of the spring being adjustable by means of an adjusting screw 87. Two wires 88, 89 enter the case 6 at a point near the governor 73. One such wire 89 leads to a pin 90 surrounded by fiber bushing 91. The other wire 88 is electrically connected to the fixed contact 83, through a conducting member 92. The pin 90 is electrically connected to the movable contact 84 through the stationary part 93 and the movable contact member 81. It will be apparent that the fixed contact 83 and movable contact 84 are separated whenever the motor speed exceeds a predetermined value.

The separation of the contacts 83, 84, effected by the action of the governor 73, varies the resistance in the field of the motor 5 in the following manner. As represented in the wiring diagram of Fig. XIV, current from an outside source enters the plug 94 through a wire 95 and passes through an automatically opening starting and time switch 96 hereinafter described. Thence the current passes through the wire 97 and divides, one branch leading to a resistance unit 98 and the other leading to a series of resistance units comprehensively designated at 99. From the resistance unit 98, the wire 89 leads to the movable contact 84 of the governor 73 as hereinbefore described. From the fixed contact 83 the wire 88 leads to the opposite side of the resistance units 99 and joins a wire 100 leading to the field winding 101 of the motor 5. A return wire 102 leads from the motor 5 to the plug 94. In an obvious manner, whenever the governor switch is actuated to separate contacts 83, 84 all the current passes through the resistance units 99 to the field winding 101 of the motor 5. On the other hand, when the contacts 83, 84 of the governor switch are closed, the current divides, a portion passing through the resistance unit 98, and the other portion passing through the resistance units 99. This variation of the resistance in the field winding 101 of the motor 5 serves to control very accurately the speed of the motor, and to maintain it at a constant value at all times.

The cut out switch 96 is operated by a timing device comprehensively designated at 103 (see Figs. III and V) and serves to limit the time of operation of the motor 5 so that it will not waste tape. Inasmuch as the tape 1 is drawn from the reel 7 at a very rapid rate, say, twenty feet per minute, if the motor 5 is left running for a period longer than that required to obtain the desired record on the tape, the tape will soon be wasted. The timing device 103 is operated by means of a handle 104 projecting through the side of the case 6. The handle 104 is fixed to a shaft 105, and beyond this shaft it carries a counterweight 106. With rotation of the shaft 105, a gear 107 rotates. The gear 107 drives a pinion 108 which in turn drives an additional gear 109. An oscillating anchor pallet 110 engages teeth in the gear 109, the pallet 110 being connected through an arm 111 to a weight 112. In a manner similar to the action of escapements of clocks, the pallet 110 oscillates under the influence of the weight 112 and allows intermittent movement of the gear 109, one tooth at a time. To start the timing device in operation, the handle 104 is pressed downwardly to its limit of travel. As soon as released, the handle 104 will gradually move upwardly, step by step in accordance with the action of the escapement, until eventually the inner end 113 will strike a pivoted plate 114 of the cut out switch 96.

The cut out switch is shown most clearly in Figs. V and VII. It includes a pair of fixed contacts 115, a pair of movable contacts 116, supported on the movable plate 114, and a post 117 upon which the plate 114 is fulcrumed. A spring 118 normally urges the movable contacts 116 into engagement with the fixed contacts 115. An additional spring 119 serves to balance the parts. When the end 113 of the timing switch handle 104 strikes the movable plate 114, the contacts 116 are separated from the contacts 115 against the action of the spring 118. A post 120 limits the upward movement of the movable plate 114.

Conveniently the wires 102 and 95 pass through a flexible connection 121 to the plug 94 which leads to a source of electrical energy. Such flexible connections are also employed between the case 6 and the hand piece 4, and between the terminal 68 at the top of the case and the battery 63. In this manner the case 6 and all its accessories are rendered portable. The case can be carried with ease to the machine under test. Moreover, inasmuch as the tape bracket 7 is removable, all of the exterior accessories can be assembled into a compact mass and housed within a lid (not shown) and the entire apparatus can be moved from place to place without danger of injury to the parts.

In the foregoing description the manner in which the tape 1 is unreeled at a constant lineal velocity has been fully explained. It has also been explained that the recording device 2 is shifted laterally from side to side at a frequency corresponding to successive revolutions of the machine under test. To illustrate how the continuous line 122 drawn on the tape 1 by the stylus 17 measures the acceleration of the machine, the various shifts in the line have been successively designated at A to H, inclusive, and a typical operation of the device takes place in the following manner.

When it is desired to operate the device, the motor circuit is connected to a source of electrical power by means of the plug 94, but the motor will not run until the timing switch at the side of the case 6 is pressed down. The recording device is placed in readiness for operation by closing the hand switch 55 at the top of the case 6. Then the hand piece 4 is pressed against the machine to be tested. Finally the motor 5 of the accelerometer is started by pressing the handle 104 of the timing switch all the way down, and simultaneously the motor of the machine to be tested is set in motion. Upon the assumption that the machine to be tested is a sewing machine, the stylus 17 will shift from one side of the tape to the other with every stitch or revolution of the machine. As soon as the distance represented on the tape between shifts becomes uniform, it will be apparent that the machine is operating at its top speed. Moreover, the length of line drawn between two successive shifts will indicate the speed at which the machine operates for any particular stitch, and the distance from the first shift of the stylus until the point of maximum speed is reached (when all shifts are equi-distant) indicates the time required for the machine to reach top speed.

A typical example of the operation of a sewing machine, as determined by the device of this invention, is represented in the following table:

| Stitch | From | To | Distance | Indicated R. P. M. | Time in seconds |
|---|---|---|---|---|---|
| 1 | A | B | 1¼″ | 575 | .104 |
| 2 | B | C | 1⁵⁄₁₆″ | 780 | .077 |
| 3 | C | D | 1⅜″ | 895 | .067 |
| 4 | D | E | 2¹⁄₃₂″ | 1110 | .054 |
| 5 | E | F | ⅝″ | 1150 | .052 |
| 6 | F | G | 1⁹⁄₃₂″ | 1225 | .049 |
| 7 | G | H | 1⁷⁄₃₂″ | 1500 | .040 |
| Total | | | 5¹³⁄₃₂″ | | .443 |

The maximum speed of the sewing machine under test, being fifteen hundred revolutions per minute, as shown in the above table, this speed was attained at the end of seven stitches or revolutions. The interval of .443 second from the moment of standing start to the moment at which full speed was attained is gained by totalling the "time" column. The rate of acceleration of the machine is also immediately apparent from inspection of the "time" column. It will be noted that the first stitch or revolution required approximately one-tenth of a second, whereas the seventh stitch or revolution required approximately four-hundredths of a second.

In order that the results appearing on the measuring tape may be reduced to a chart, it is convenient to employ two scales which can be placed on the inside of the lid (not shown) covering the case 6, one of these scales representing "time" in seconds, and the other representing "indicated revolutions per minute." By placing the tape 1 on one such scale and then on the other, and measuring the distances between the points of shift A—B, B—C, etc., a chart showing the operation of the machine can be quickly prepared.

The accelerometer of this invention may be used to advantage in selecting the proper type of motor to drive a particular type of sewing machine, and in detecting inefficiencies of operation, such as those which occur from a loose belt, or the use of a motor of unnecessarily large horse power rating.

While the device of this invention has been described with reference to its use in determining the acceleration and starting interval of a sewing machine, it will of course be apparent that the device has many other applications and can be applied to many types of high speed machines. Furthermore, while one example or embodiment of the invention has been described herein in some detail, it will be apparent to those skilled in the art that the apparatus herein described and illustrated may be varied considerably without departure from the spirit of the invention as defined in the annexed claims.

Furthermore, I desire it to be understood that in using the term "revolution" or "cycle" herein, as applied to the machine under test, I mean to include a cycle of operation, irrespective of the type of mechanical movement involved.

Having thus described my invention, I claim:
1. In apparatus for determining acceleration of a machine, the combination with means for moving a travelling chart at a uniform rate, and a recording device for marking said chart movable in different directions relative to the chart, transversely of its movement as aforesaid, of means actuated by the machine under test for moving said recording device in one direction for one revolution or complete cycle of operation of said machine and in the other direction for the succeeding revolution or complete cycle of the machine, and so on in alternate succession, whereby each single mark in a given direction made on the chart by said device corresponds to a complete cycle of operation, and the distance between successive single marks represents the time of a complete cycle.

2. In apparatus for determining acceleration of a machine, the combination with means for moving a travelling chart at a uniform rate, and a recording device for marking said chart movable in different directions relative to the chart, transversely of its movement, of separate electromotive devices for moving said recording device in the different directions as aforesaid, and means actuated by the machine under test to energize the said electromotive devices in alternation at the successive revolutions or complete cycles of operation of said machine, so that each single mark in a given direction made on the chart by said device corresponds to a complete cycle of operation, and the distance between successive single marks represents the time of a complete cycle.

3. In apparatus for determining acceleration of a machine, the combination with means for moving a travelling chart at a uniform rate, and a recording device for marking said chart movable in different directions relative to the chart, transversely of its movement; of electromagnetic means for moving said recording device in both directions as aforesaid, means including a commutator for energizing said electromagnetic means for operation both ways at each cycle of operation of the commutator, and means for driving said commutator from the machine under test at reduced speed so that each single transverse mark on the chart by said device corresponds to a complete cycle of operation of said machine, and the distance between successive transverse marks represents the time of a complete cycle.

ALBERT C. PETERSON.